United States Patent
Qian et al.

(10) Patent No.: US 11,485,013 B2
(45) Date of Patent: Nov. 1, 2022

(54) MAP CREATION METHOD OF MOBILE ROBOT AND MOBILE ROBOT

(71) Applicant: GUANGZHOU COAYU ROBOT CO., LTD, Guangzhou (CN)

(72) Inventors: Feifan Qian, Guangzhou (CN); Kai Yang, Guangzhou (CN); Zhuobin Zheng, Guangzhou (CN); Huang Ding, Guangzhou (CN)

(73) Assignee: GUANGZHOU COAYU ROBOT CO., LTD., Guangzhou (CN)

( * ) Notice: Subject to any disclaimer, the term of this patent is extended or adjusted under 35 U.S.C. 154(b) by 303 days.

(21) Appl. No.: 16/805,567

(22) Filed: Feb. 28, 2020

(65) Prior Publication Data

US 2020/0198139 A1  Jun. 25, 2020

Related U.S. Application Data

(63) Continuation of application No. PCT/CN2018/073929, filed on Jan. 24, 2018.

(30) Foreign Application Priority Data

Sep. 27, 2017 (CN) .......................... 201710887958.0

(51) Int. Cl.
  *B25J 9/16* (2006.01)
  *G05D 1/02* (2020.01)
(52) U.S. Cl.
  CPC .......... *B25J 9/1664* (2013.01); *G05D 1/0219* (2013.01)
(58) Field of Classification Search
  None
  See application file for complete search history.

(56) References Cited

U.S. PATENT DOCUMENTS

| 2014/0371871 A1* | 12/2014 | Farina | ...... A61F 2/54 623/24 |
| 2016/0059420 A1* | 3/2016 | Ji | ............ B25J 5/00 348/148 |

(Continued)

FOREIGN PATENT DOCUMENTS

| CN | 102866706 A | 1/2013 |
| CN | 103680291 A | 3/2014 |

(Continued)

OTHER PUBLICATIONS

Guangjun Shi, SIFT Feature Point Matching Based on Improved RANSAC Algorithm, 2013 (Year: 2013).*

(Continued)

*Primary Examiner* — Jeff A Burke
*Assistant Examiner* — Arslan Azhar
(74) *Attorney, Agent, or Firm* — Bayes PLLC (57) ABSTRACT

The present disclosure discloses a map creation method of a mobile robot, the mobile robot working indoors, comprising the following steps: S1: obtaining Euler angles of a current point relative to a reference point according to a ceiling image taken from the current point and the reference point; S2: determining whether the roll angle of the Euler angles is lower than a set value, if so, saving the map data of the current point, otherwise, not saving the map data of the current point; S3: returning to step S1 after the mobile robot moves a predetermined distance or for a predetermined time; S4: repeating steps S1 through S3 until the map creation in the working area is complete. The present disclosure also discloses a mobile robot using the above method.

19 Claims, 6 Drawing Sheets

(56) References Cited

U.S. PATENT DOCUMENTS

| | | | |
|---|---|---|---|
| 2016/0184990 A1* | 6/2016 | Song | G05D 1/024 701/2 |
| 2017/0066134 A1* | 3/2017 | Cakmakci | B25J 5/00 |
| 2017/0094161 A1* | 3/2017 | Graham | G06V 10/44 |
| 2018/0052471 A1* | 2/2018 | Horst | G01C 21/206 |
| 2018/0055312 A1* | 3/2018 | Jung | G06T 19/006 |
| 2018/0120116 A1* | 5/2018 | Rombouts | G01S 17/89 |

FOREIGN PATENT DOCUMENTS

| | | |
|---|---|---|
| CN | 104881029 A | 9/2015 |
| CN | 105606092 A | 5/2016 |
| JP | 2007121528 A | 5/2007 |
| JP | 5557189 B2 | 7/2014 |
| JP | 2017005532 A | 1/2017 |
| JP | 2017027213 A | 2/2017 |

OTHER PUBLICATIONS

Stackoverflow, Roll pitch and yaw from Rotation matrix with Eigen Library, 2014. Accessed through https://stackoverflow.com/questions/27508242/roll-pitch-and-yaw-from-rotation-matrix-with-eigen-library (Year: 2014).*

International Search Report and Written Opinion in corresponding International Application No. PCT/CN2018/073929, dated Jul. 2, 2018, 10 pages.

Non-Final Notice of Reasons for Rejection issued in related Japanese Application No. 2020-504360, dated Feb. 2, 2021, 5 pages.

Partial supplementary European Search Report in related European Application No. 18860830.1, dated Nov. 11, 2020, 10 pages.

Ravi Kaushik et al: "Polygon-based laser scan registration by heterogeneous robots", Robotics and Biomimetcs (ROBIO), 2010 IEEE International Conference On, IEEE, Dec. 14, 2010.

Folkesson J et al:"Vision SLAM in the Measurement Subspace", Robotics and Automation, 2005. Proceedings of The 2005 IEEE International Conference On Barcelona, Spain Apr. 18-22, 2005, Piscataway, NJ, USA, IEEE, Apr. 18, 2005.

Adam Schmidt et al:"The Visual SLAM System for a Hexapod Robot", Sep. 20, 2010, Computer Vision and Graphics, Springer Berlin Heidelberg, Berlin, Heidelberg.

* cited by examiner

MAP CREATION METHOD OF MOBILE ROBOT AND MOBILE ROBOT

CROSS-REFERENCE TO RELATED APPLICATION

This application is continuation of International Application No. PCT/CN2018/073929, filed on Jan. 24, 2018, entitled "MAP CREATION METHOD OF MOBILE ROBOT AND MOBILE ROBOT," which claims priority to Chinese Patent Application No. 201710887958.0 filed on Sep. 27, 2017, both of which are hereby incorporated by reference in their entireties.

BACKGROUND

The present disclosure relates to the field of mobile robots, and particularly to a map creation method of an indoor mobile robot and the mobile robot adopting the method.

With the development of mobile robot technology, the existing indoor mobile robots (such as cleaning robots and air purification robots) often have the function of map creation. However, due to accidents (such as child or pet collision) occurred during a mobile robot's working process or uneven working surface and other reasons, the mobile robot may shift or rotate on the working surface, and consequently, its sensors may obtain inaccurate environment information, resulting in errors in the map data created, thus affecting the positioning and navigation of the mobile robot, reducing the working efficiency of the mobile robot and even leading to the mobile robot's inability to work.

Therefore, there is a need to provide a map creation method that can solve the above problems.

SUMMARY

One of the objects of the present disclosure is to overcome the defects in the background technology and provide a map creation method that reduces errors of the map data, the specific solution being as follows:

A map creation method of a mobile robot, the mobile robot working indoors, comprises the following steps: S1: obtaining Euler angles of a current point relative to a reference point according to ceiling images obtained at the current point and the reference point; S2: determining whether the roll angle θy of the Euler angles is lower than a preset value, if so, saving the map data of the current point, if not, not saving the map data of the current point; S3: returning to step S1 after the mobile robot moves a predetermined distance or for a predetermined time; S4: repeating steps S1 through S3 until the map creation in a working area is complete; wherein, the current point is the current position of the mobile robot, and the reference point is the position where the mobile robot saves the map data.

Further, the step S1 comprises the following sub-steps: S11: obtaining ceiling images by a camera on the mobile robot at the reference point and the current point; S12: calculating a basic matrix F of the camera at the reference point and the current point according to an image matching algorithm; S13: obtaining an eigenmatrix E according to the basic matrix F and a camera internal parameter matrix K; S14: obtaining a rotation matrix R based on eigenmatrix E singular value decomposition; S15: calculating Euler angles of the mobile robot at the current point relative to the reference point based on the rotation matrix R Preferably, in one embodiment of the present invention, the preset value of the angle range is 5° to 10°.

Preferably, the reference point at which the mobile robot starts to create a map is the position at which the mobile robot starts to work or the position of a charging base.

The second object of the present disclosure is to overcome the defect in the background technology and provide a mobile robot capable of reducing the map data error, the solutions of which are as follows:

Solution 1: a mobile robot adopting the above map creation method, the mobile robot comprising a panoramic camera and a control module, the panoramic camera being used for photographing ceiling images and surrounding environment images, and the control module being used for calculating Euler angles and converting surrounding environment images into map data.

Solution 2: a mobile robot adopting the above map creation method, the mobile robot comprising a camera, a laser radar and a control module, the camera being used for photographing ceiling images, the laser radar being used for obtaining surrounding environment information, and the control module being used for calculating Euler angles and converting surrounding environment information into map data.

Compared with the prior art, the technical solution of the present disclosure effectively determines whether the mobile robot deflects on the working surface, and deletes the map data with errors when the mobile robot deflects, thus improving the map creation accuracy of the mobile robot.

BRIEF DESCRIPTION OF THE DRAWINGS

In order to more clearly explain the technical solution of the embodiment of the present invention, the following will be a brief introduction of the drawings to be used in the embodiment. It is obvious that the drawings in the following description are some embodiments of the present invention, and for a person having ordinary skill in the art, other drawings can also be obtained based on these drawings without involving inventive skills.

DETAILED DESCRIPTION

A clear and complete description of the technical solution of the present disclosure will be provided in conjunction with the drawings and a specific embodiment. It is clear that the embodiment described here is the only portion of the embodiments of the present invention, not all embodiments. Based on the specific embodiment described in the present invention, all other embodiments obtained by a person having ordinary skill in the art without inventive skills shall fall within the scope of protection as defined by claims of the present invention.

Embodiment 1

The mobile robot in the embodiment is illustrated with a cleaning robot as an example. The mobile robot of the present disclosure can also include an indoor air purification robot or an indoor monitoring robot.

Figure 5:
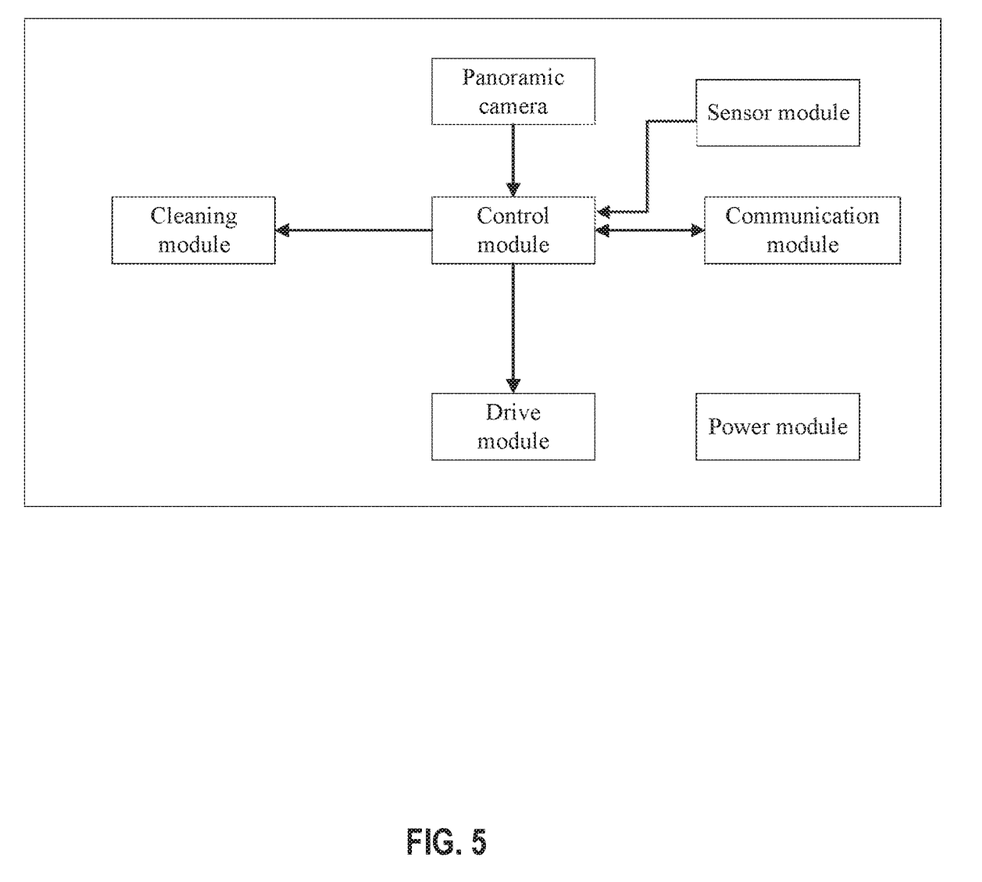
FIG. 5 is a module diagram of the mobile robot in a preferred embodiment of the present invention.
Figure 6:
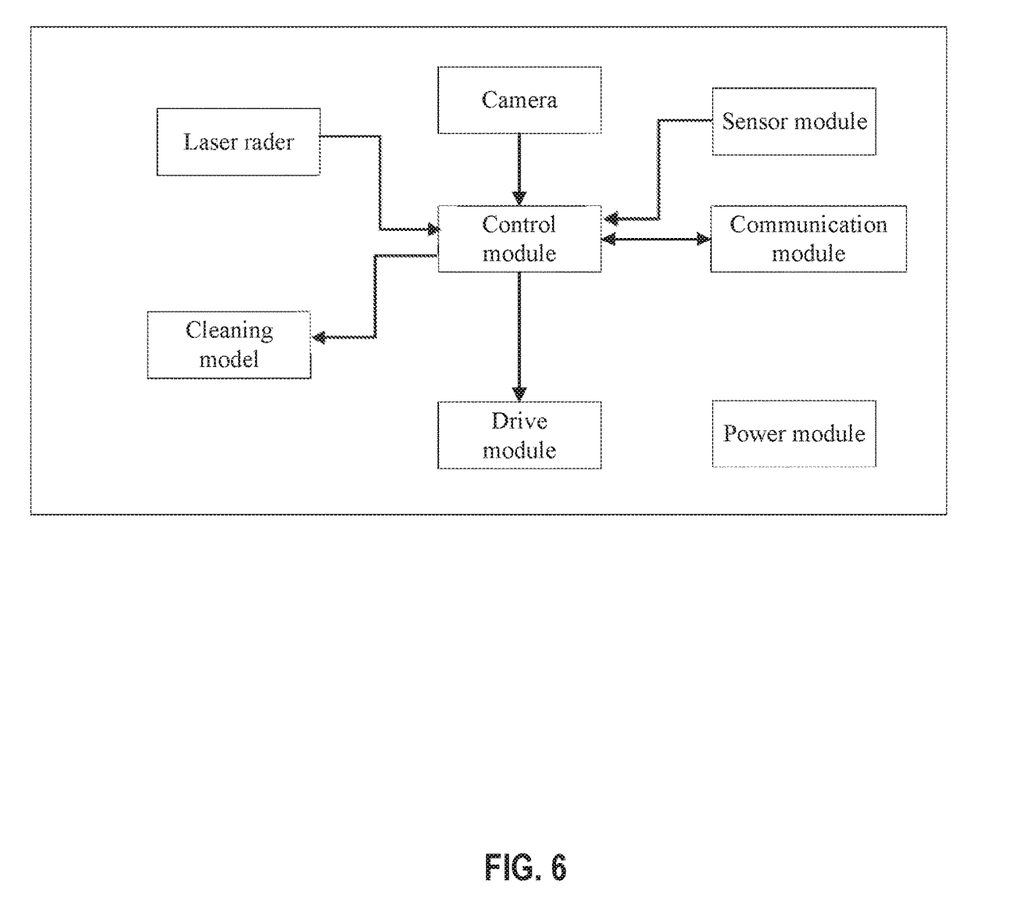
FIG. 6 is a module diagram of the mobile robot in another embodiment of the present disclosure.

As shown in FIG. 5, the cleaning robot in this embodiment includes a panoramic camera, a sensor module, a cleaning module, a control module, a communication module, a drive module, and a power module, wherein the arrow direction represents a transmission direction of data or instructions. The panoramic camera is preferably installed on the top of the cleaning robot and inclines to a forward direction of the cleaning robot, which can simultaneously capture a ceiling image and an environmental image in the forward direction, and send relevant images to the control module; the sensor module in this embodiment is used for ground inspection and wall inspection, such as an infrared sensor, an ultrasonic sensor, a Hall sensor, a collision sensor and the like, which are used for inspecting whether the cleaning robot encounters an obstacle or works abnormally; the cleaning module is used to perform cleaning actions, including middle sweeping, side sweeping and fanning; the control module is used to calculate Euler angles according to ceiling images taken by the panoramic camera and to produce map data according to environmental images, and at the same time control the cleaning robot to perform relevant actions according to the relevant information of the sensor module; the communication module is used to receive external commands (remote control or mobile phone) and send the map information and/or working status information of the cleaning robot to a user terminal; the drive module is left and right driving wheels and universal wheels, the left and right driving wheels driving the cleaning robot to move on the working surface under the command of the control module; the power module can be a rechargeable battery, which is used to provide energy for the cleaning robot to work.

Figure 1:
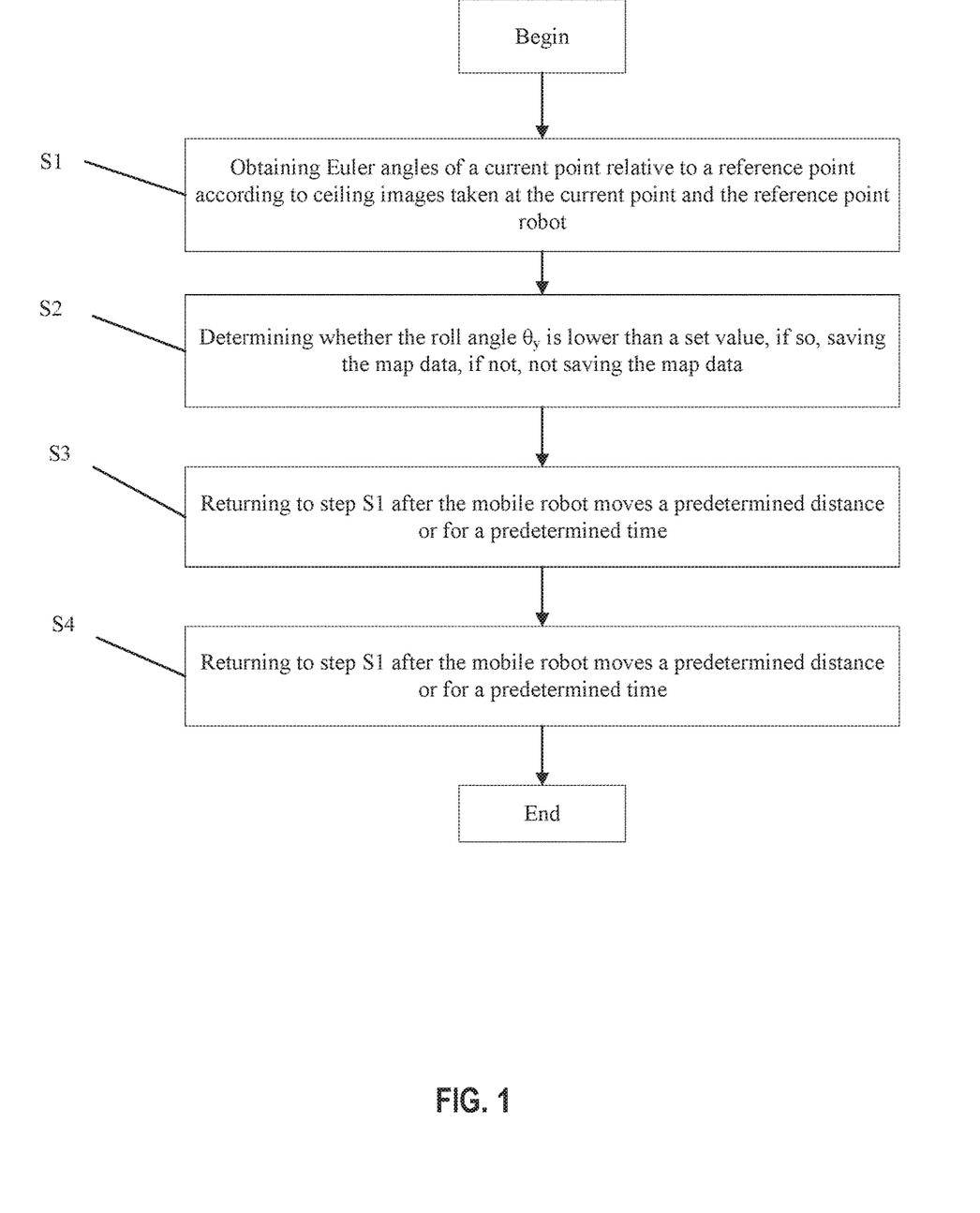
FIG. 1 is a flow chart of a map creation method of a mobile robot of the present invention.

FIG. 1 is a flowchart of the map creation method of the cleaning robot in the embodiment of the present invention, which will be described in detail below.

Before starting step S1, the cleaning robot will determine a reference point and create a map at that point. In this embodiment, the position where the cleaning robot starts to work (generally the position of the charging base) is generally considered to be the normal working condition of the cleaning robot (that is, a connection line between the left and right driving wheels is parallel to the working surface), and the panoramic camera takes the ceiling image at the position where the cleaning robot starts to work and sends the ceiling image to the control module, and the surrounding environment pictures taken by the panoramic camera are sent to the control module at the same time; the control module will keep the ceiling picture at the starting position, and at the same time process the surrounding environment pictures to obtain map data and save them.

S1: obtaining Euler angles of the current point relative to the reference point according to the ceiling images taken at the current point and the reference point.

After the cleaning robot works a distance or for a period of time, the panoramic camera will take the ceiling image again and send it to the control module. The control module calculates the Euler angles of the current point relative to the reference point according to the ceiling image taken at the current point and the stored ceiling image taken at the reference point.

Figure 2:
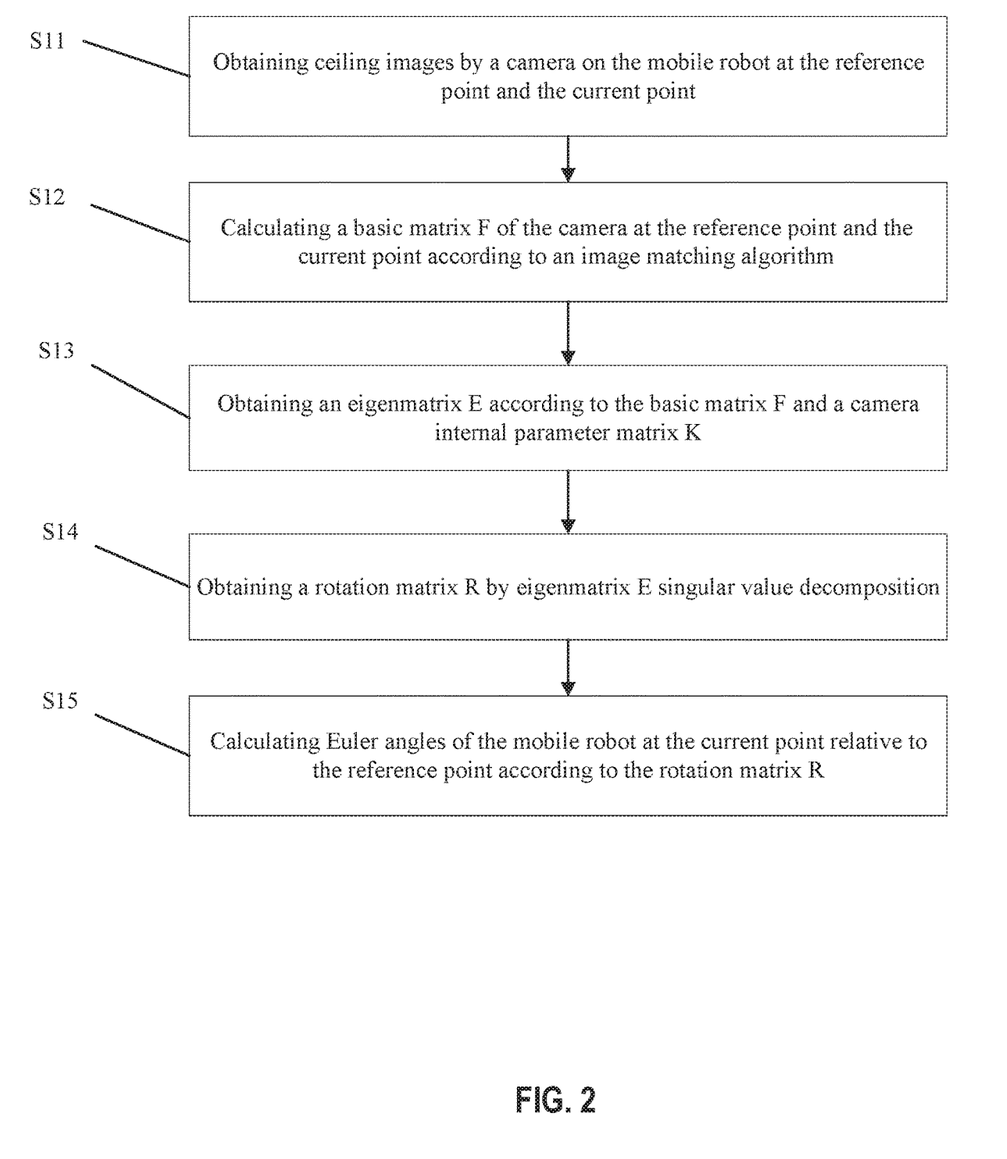
FIG. 2 is a flow chart of obtaining Euler angles of a current point of the mobile robot relative to a reference point in the present invention.

As shown in FIG. 2, the calculation process of the Euler angles of the cleaning robot at the current point relative to the reference point is as follows:

S11: obtaining ceiling images by the camera on the mobile robot at the reference point and the current point.

S12: calculating a basic matrix F of the camera at the reference point and the current point according to an image matching algorithm.

In this embodiment, point matching is used and the basic matrix is calculated by the RANdom SAmple Consensus (RANSAC) algorithm, including: (1) automatically extracting feature point sets of the two images and establishing an initial "matching pair set"; (2) RANSAC algorithm removing false matching: a) calculating the basic matrix F determined by the current sampling, and its consistent point set S(F); b) if the current set of consistent points is larger than an original set, maintaining the current consistent point set S(F) and the corresponding basic matrix F, and deleting the original consistent point set and the corresponding basic matrix; c) terminating the sampling process by an adaptive algorithm to obtain a maximum consistent point set, the matching pairs (inner points) the maximum consistent point set being the correct matching pairs; and (3) re-estimating the basic matrix by the maximum consistent point set (i.e., correct matching pairs).

S13: obtaining an eigenmatrix E according to the basic matrix F and the camera internal parameter matrix K.

The relationship between the eigenmatrix E and the basic matrix F is as follows: $E=K^TFK$, where K is the internal parameter matrix, which is obtained through camera calibration.

S14: obtaining a rotation matrix R based on eigenmatrix E singular value decomposition.

The eigenmatrix E consists of a rotation matrix and a translation vector t. When solving real data, the rotation matrix decomposed by the eigenmatrix is usually not accurate, so singular value decomposition (SVD) is needed to decompose accurate rotation matrix and translation vector from the eigenmatrix E. Let the rotation matrix of the real data be R, decompose R into two orthogonal matrices U and V, D being the singular value of the matrix R, and the formula being R=UDVT.

S15: calculating the Euler angles of the mobile robot at the current point relative to the reference point according to the rotation matrix R.

Set D as a unit array 1 to obtain an accurate rotation matrix $R'=UIV^T$, and set the accurate rotation matrix as follows:

$$R' = \begin{bmatrix} r11 & r12 & r13 \\ r21 & r22 & r23 \\ r31 & r32 & r33 \end{bmatrix}.$$

Figure 4:
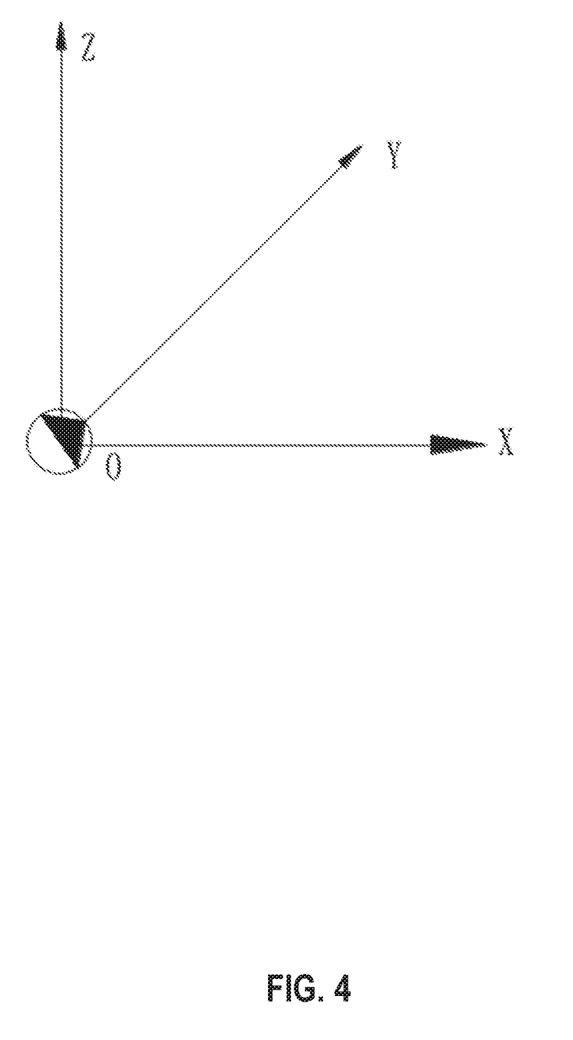
FIG. 4 is a representation of Euler angles of the mobile robot of the present disclosure in a world coordinate system.

FIG. 4 is the coordinate axis representation of the cleaning robot in the world coordinate system. The black triangle direction is the initial motion direction of the cleaning robot, the xy plane is parallel to the working surface (ground), and the z axis is perpendicular to the working surface, where θx is the angle of rotation around the x axis (pitch angle), θy is the angle of rotation around the y axis (roll angle), and θz is the angle of rotation around the z axis (yaw angle).

According to the expression of the rotation matrix, the Euler angles can be deduced by trigonometric functions as follows:

$\theta_x = a\tan 2(r_{32}, r_{33})$ $\theta_y = a\tan 2(-r_{31}, \sqrt{r_{32}^2 + r_{33}^2})$ $\theta_z = a\tan 2(r_{21}, r_{11})$ S2: determining whether the roll angle θy of the Euler angles is lower than a preset value, if so, saving the map data of the current point, if not, not saving the map data of the current point.

When θx is not zero, it indicates that the cleaning robot rotates around the x-axis. For example, the cleaning robot may move from the floor to a carpet (due to the thickness of the carpet), but it does not affect the shooting angle of the panoramic camera of the cleaning robot. The panoramic camera obtains complete environmental image information, and the map created according to the environmental image information is accurate. When θy is not zero, it indicates that the cleaning robot rotates around the y-axis, and the panoramic camera deflects. When the deflection angle is higher than a preset value, the environmental image information on the left or right will not be acquired completely, resulting in an inaccurate map created according to the environmental image. The preset value in this embodiment should be lower than 10°, preferably lower than 5°. When the θz is not zero, it indicates that the cleaning robot rotates around the z-axis. The rotation does not affect the shooting angle of the panoramic camera, and then the map data created according to the environmental image information is accurate. When the deflection angle θy of the cleaning robot at the current point relative to the reference point is lower than the preset value (5° to 10°), it is considered that the cleaning robot is still on the working surface. At this time, the current point is taken as a key point, the environmental image obtained is sent to the control module for map creation. In this embodiment, a current point whose deflection angle θy is lower than the preset value can be saved as a reference point. When the deflection angle θy of the cleaning robot at the current point relative to the reference point is higher than the preset value (5° to 10°, it is considered that the cleaning robot has deviated from the working surface. At this time, using the current point as the key point and sending the environmental image to the control module are abandoned.

S3: returning to step S1 after the mobile robot moves a predetermined distance or for a predetermined time.

S4: repeating steps S1 through S3 until the map creation in the working area is complete.

In the step S1, the current point is the current position of the mobile robot, and the reference point is the position where the mobile robot saves the map data.

Figure 3:
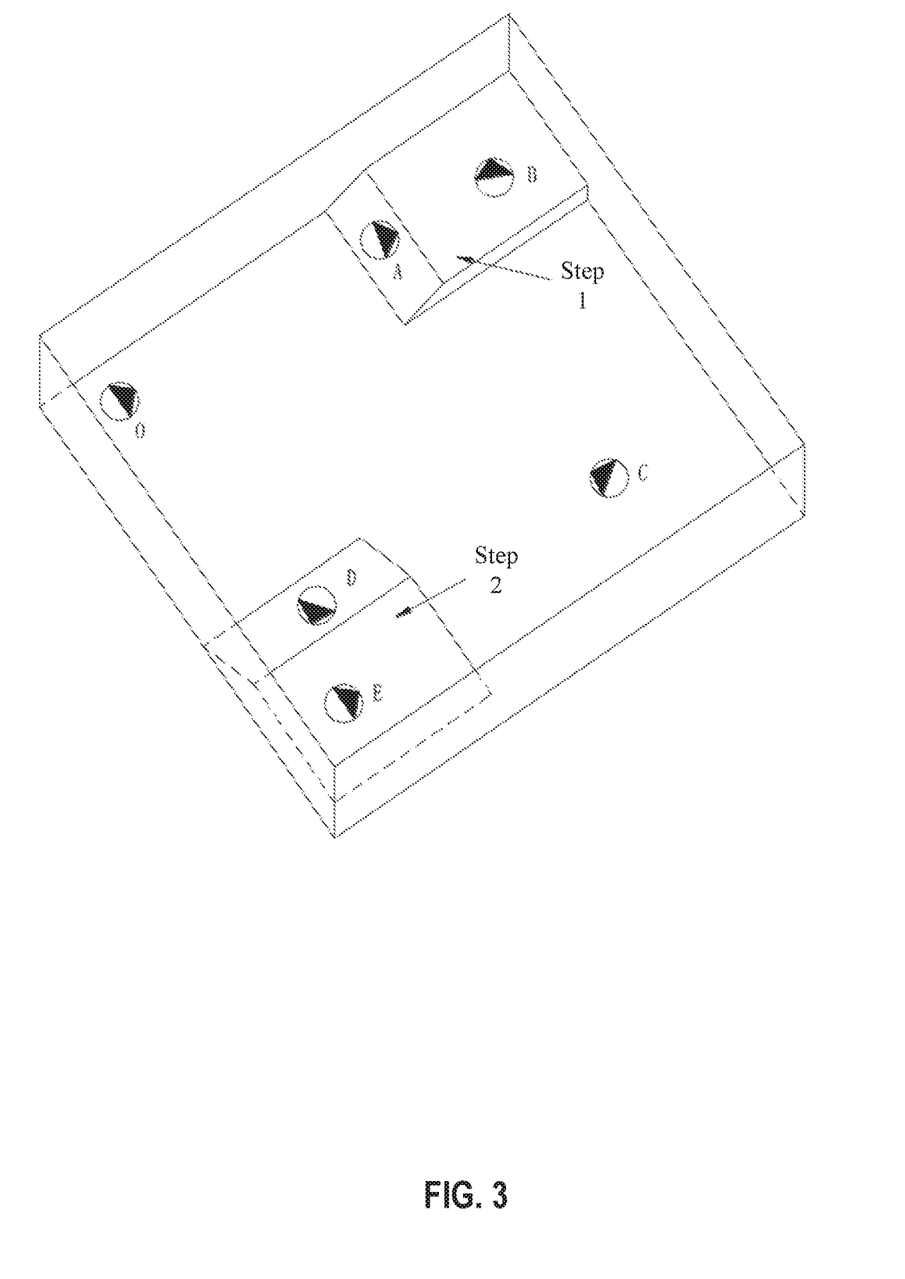
FIG. 3 is a schematic diagram of an indoor environment of the mobile robot of the present invention.

FIG. 3 is a schematic diagram of the working environment of the cleaning robot in the embodiment, in which steps 1 and 2 are included. The cleaning robot starts to work at point O, obtains the ceiling image of point O through the panoramic camera and saves it, and at the same time, it sends the environmental image obtained at point O to the control module for processing and then obtains the map data and saves it.

When the cleaning robot moves to point A, that is, on the inclined surface of step 1, the Euler angles of point A relative to point O are calculated by the ceiling image at point A and the saved ceiling image at point O, and the Euler angles obtained at point A relative to point O are: θx≠0, θy≠0, θZ≠0. Since the roll angle θy is greater than the preset value (5° to 10°), the environmental image obtained at point A will not be sent to the control module for map data creation. Similarly, when the cleaning robot is located at point D on the inclined surface of step 2, it can also be calculated that the roll angle θy of the Euler angles of point D relative to point O is greater than the preset value (5° to 10°), and the environmental image acquired at point D will not be sent to the control module for map data creation.

When the cleaning robot moves to point B and point E, that is, on the horizontal surface of step 1 or step 2, the Euler angles of point B and point E relative to point O is calculated by the ceiling image at point B and the ceiling image saved at point O, and the Euler angles obtained of point B and point E relative to point O are: θx≠0, θy=0, θZ≠0. Since the roll angle θy is equal to zero and lower than the preset value (5° to 10°), the environmental images acquired at point B and point E will be sent to the control module for map data creation.

When the cleaning robot moves to point C, the Euler angles of point C relative to point O are calculated by calculating the ceiling image at point C and the ceiling image saved at point O, and the obtained Euler angles of point C relative to point O is: θx=0, θy=0, θZ≠0. Since the roll angle θy is equal to zero and lower than the preset value (5° to 10°), the environmental image acquired at point C will be sent to the control Make the module for map data creation.

Embodiment 2

As shown in FIG. 5, this embodiment discloses another mobile robot to realize the above-mentioned map creation method. The mobile robot in this embodiment is basically the same as that in Embodiment 1. The difference is that the mobile robot in this embodiment does not have a panorama camera, but implements the panorama camera function in the embodiment through a general camera and a laser radar, where the camera is used for photographing ceiling images, and the laser radar is used for obtaining the surrounding environment information, and the control module is used for calculating the Euler angles and converting the surrounding environment information into map data.

What has been disclosed above are only embodiments of the technical solution of the present invention, and the scope of the present disclosure is not limited thereto. Therefore, equivalent variations according to the claims of the present disclosure are still within the scope of the present disclosure.

What is claimed is:

1. A method for creating a map in a working area for a mobile robot, the method comprising:
    S1: obtaining Euler angles of a current point relative to a reference point based on images obtained at the current point and the reference point, and an eigenmatrix (E) based on a basic matrix (F) and a camera internal parameter matrix (K) obtained through camera calibration, wherein a relationship between the eigenmatrix and the basic matrix is $E=K^T FK$;
    S2: determining whether a roll angle of the Euler angles is lower than a preset value, and saving map data of the current point if the roll angle of the Euler angles is lower than the preset value;
    S3: returning to step S1 after the mobile robot moves a predetermined distance or for a predetermined time; and
    S4: repeating steps S1 through S3 until a map creation in the working area is complete,
    wherein the current point is a current position of the mobile robot, and the reference point is a position where the mobile robot saves the map data.

2. The method of claim 1, wherein S1 further comprises:
    S11: obtaining the images by a camera on the mobile robot at the reference point and the current point;
    S12: calculating the basic matrix of the camera at the reference point and the current point based on an image matching algorithm;

S13: obtaining the eigenmatrix based on the basic matrix and the camera internal parameter matrix;

S14: obtaining a rotation matrix based on singular value decomposition of the eigenmatrix; and S15: calculating the Euler angles of the mobile robot at the current point relative to the reference point based on the rotation matrix.

3. The method of claim 1, wherein the preset value of an angle range is 5° to 10°.

4. The method of claim 1, wherein the reference point at which the mobile robot starts to create the map is a position at which the mobile robot starts to work or the position of a charging base.

5. The method of claim 1, wherein the images comprise ceiling images.

6. The method of claim 5, wherein the mobile robot comprises:
a panoramic camera configured to capture the ceiling images and surrounding environment images; and
a control module configured to calculate the Euler angles and convert the surrounding environment images into the map data.

7. The method of claim 5, wherein the mobile robot comprises:
a camera configured to capture the ceiling images;
a laser radar configured to capture surrounding environment images; and
a control module configured to calculate the Euler angles and convert the surrounding environment images into the map data.

8. The method of claim 1, further comprising disregarding the map data of the current point if the roll angle of the Euler angles is not lower than the preset value.

9. The method of claim 1, wherein at S2, whether the roll angle of the Euler angles is lower than the preset value is determined based on point matching and calculation of the basic matrix by RANdom SAmple Consensus (RANSAC) algorithm.

10. The method of claim 9, wherein S2 further comprises:
automatically extracting feature point sets of the images and establishing an initial matching pair set;
removing false matching by the RANSAC algorithm; and
re-estimating the basic matrix by a maximum consistent point set.

11. The method of claim 10, wherein removing the false matching comprises:
calculating the basic matrix determined by a current sampling and its consistent point set;
if a current consistent point set is larger than an original consistent point set, maintaining the current consistent point set and the corresponding basic matrix, and deleting the original consistent point set and the corresponding basic matrix; and
terminating a sampling process by an adaptive algorithm to obtain the maximum consistent point set, matching pairs in the maximum consistent point set being correct matching pairs.

12. A cleaning robot, comprising:
a cleaning module configured to perform cleaning actions;
a sensor module configured to inspect whether the cleaning robot encounters an obstacle or works abnormally;
a panoramic camera on a top of the cleaning robot and inclining to a forward direction of the cleaning robot, the panoramic camera being configured to simultaneously capture ceiling images and surrounding environment images in the forward direction; and
a control module configured to:
calculate Euler angles based on the ceiling images and generate map data based on the surrounding environment images, wherein calculating the Euler angles comprises obtaining an eigenmatrix (E) based on a basic matrix (F) and a camera internal parameter matrix (K) obtained through camera calibration, wherein a relationship between the eigenmatrix and the basic matrix is $E=K^TFK$; and
control the cleaning actions of the cleaning module based on information related to an inspection of the sensor module.

13. The cleaning robot of claim 12, wherein the control module is further configured to:
obtain the Euler angles of a current point relative to a reference point based on the ceiling images captured at the current point and the reference point;
determine whether a roll angle of the Euler angles is lower than a preset value; and
save the map data of the current point if the roll angle of the Euler angles is lower than the preset value,
wherein the current point is a current position of the cleaning robot, and the reference point is a position where the cleaning robot saves the map data.

14. The cleaning robot of claim 13, wherein to obtain the Euler angles, the control module is further configured to:
obtain the ceiling images by the panoramic camera at the reference point and the current point;
calculate the basic matrix of the panoramic camera at the reference point and the current point based on an image matching algorithm;
obtain the eigenmatrix based on the basic matrix and the camera internal parameter matrix;
obtain a rotation matrix based on singular value decomposition of the eigenmatrix; and
calculate the Euler angles of the panoramic camera at the current point relative to the reference point based on the rotation matrix.

15. The cleaning robot of claim 12, further comprising:
a communication module configured to receive external commands and send map information and/or working status information of the cleaning robot to a user terminal;
a drive module comprising left and right driving wheels and universal wheels, the left and right driving wheels driving the cleaning robot to move on a working surface under a command of the control module; and
a power module comprising a rechargeable battery.

16. A cleaning robot, comprising:
a cleaning module configured to perform cleaning actions;
a sensor module configured to inspect whether the cleaning robot encounters an obstacle or works abnormally;
a camera configured to capture ceiling images;
a laser lidar configured to capture surrounding environment images; and
a control module configured to:
calculate Euler angles based on the ceiling images and generate map data based on the surrounding environment images, wherein calculating the Euler angles comprises obtaining an eigenmatrix (E) based on a basic matrix (F) and a camera internal parameter matrix (K) obtained through camera calibration, wherein a relationship between the eigenmatrix and the basic matrix is $E=K^TFK$; and
control the cleaning actions of the cleaning module based on information related to an inspection of the sensor module.

17. The cleaning robot of claim 16, wherein the control module is further configured to:
- obtain the Euler angles of a current point relative to a reference point based on the ceiling images captured at the current point and the reference point;
- determine whether a roll angle of the Euler angles is lower than a preset value; and
- save the map data of the current point if the roll angle of the Euler angles is lower than the preset value,
- wherein the current point is a current position of the cleaning robot, and the reference point is a position where the cleaning robot saves the map data.

18. The cleaning robot of claim 17, wherein to obtain the Euler angles, the control module is further configured to:
- obtain the ceiling images by the camera at the reference point and the current point;
- calculate the basic matrix of the camera at the reference point and the current point based on an image matching algorithm;
- obtain the eigenmatrix based on the basic matrix and the camera internal parameter matrix;
- obtain a rotation matrix based on singular value decomposition of the eigenmatrix; and
- calculate the Euler angles of the camera at the current point relative to the reference point based on the rotation matrix.

19. The cleaning robot of claim 16, further comprising:
- a communication module configured to receive external commands and send map information and/or working status information of the cleaning robot to a user terminal;
- a drive module comprising left and right driving wheels and universal wheels, the left and right driving wheels driving the cleaning robot to move on a working surface under a command of the control module; and
- a power module comprising a rechargeable battery.

* * * * *